June 4, 1957  G. C. ELLERBECK  2,794,595
CALCULATING MACHINE
Filed June 21, 1955   9 Sheets-Sheet 1

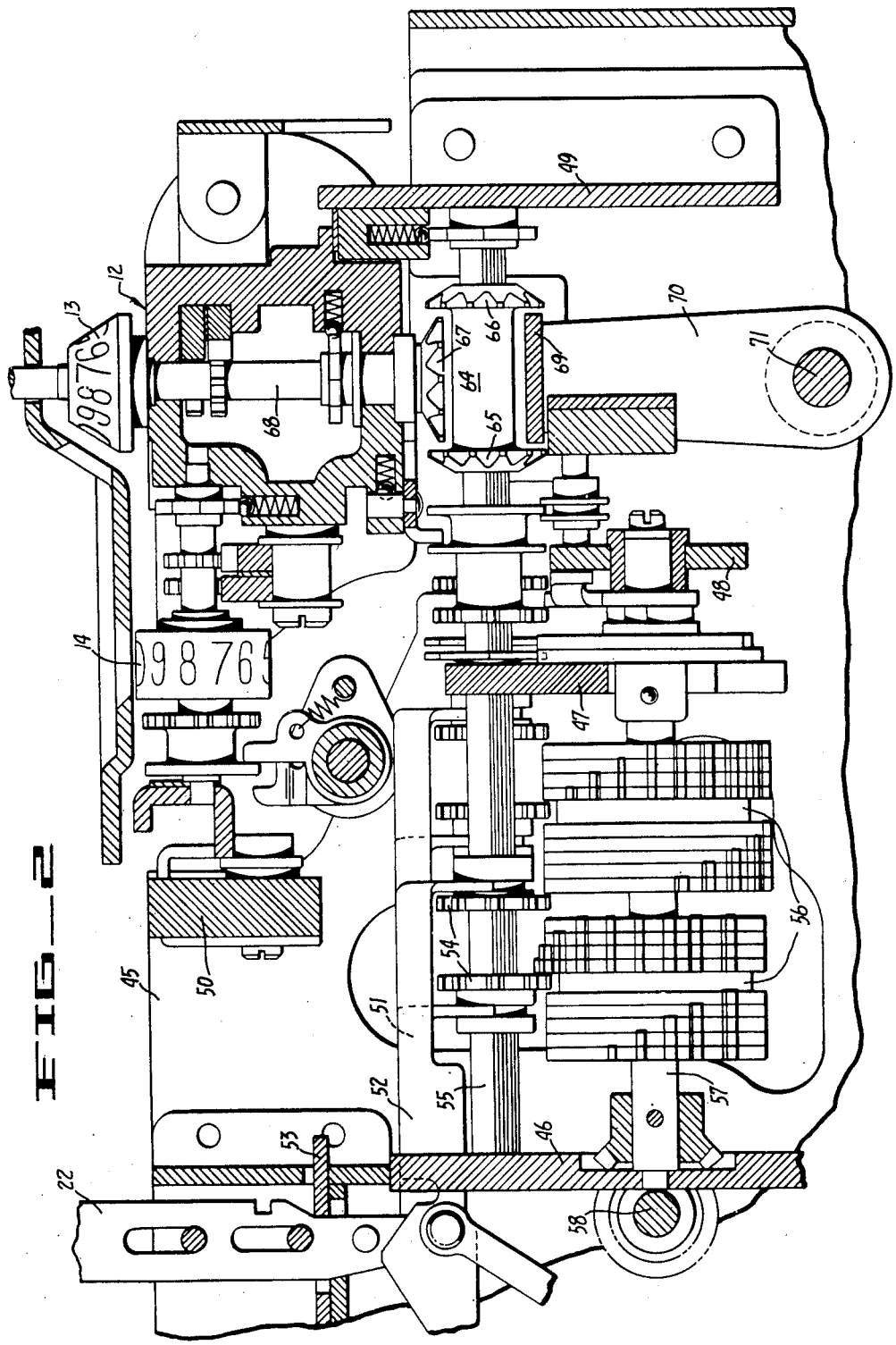

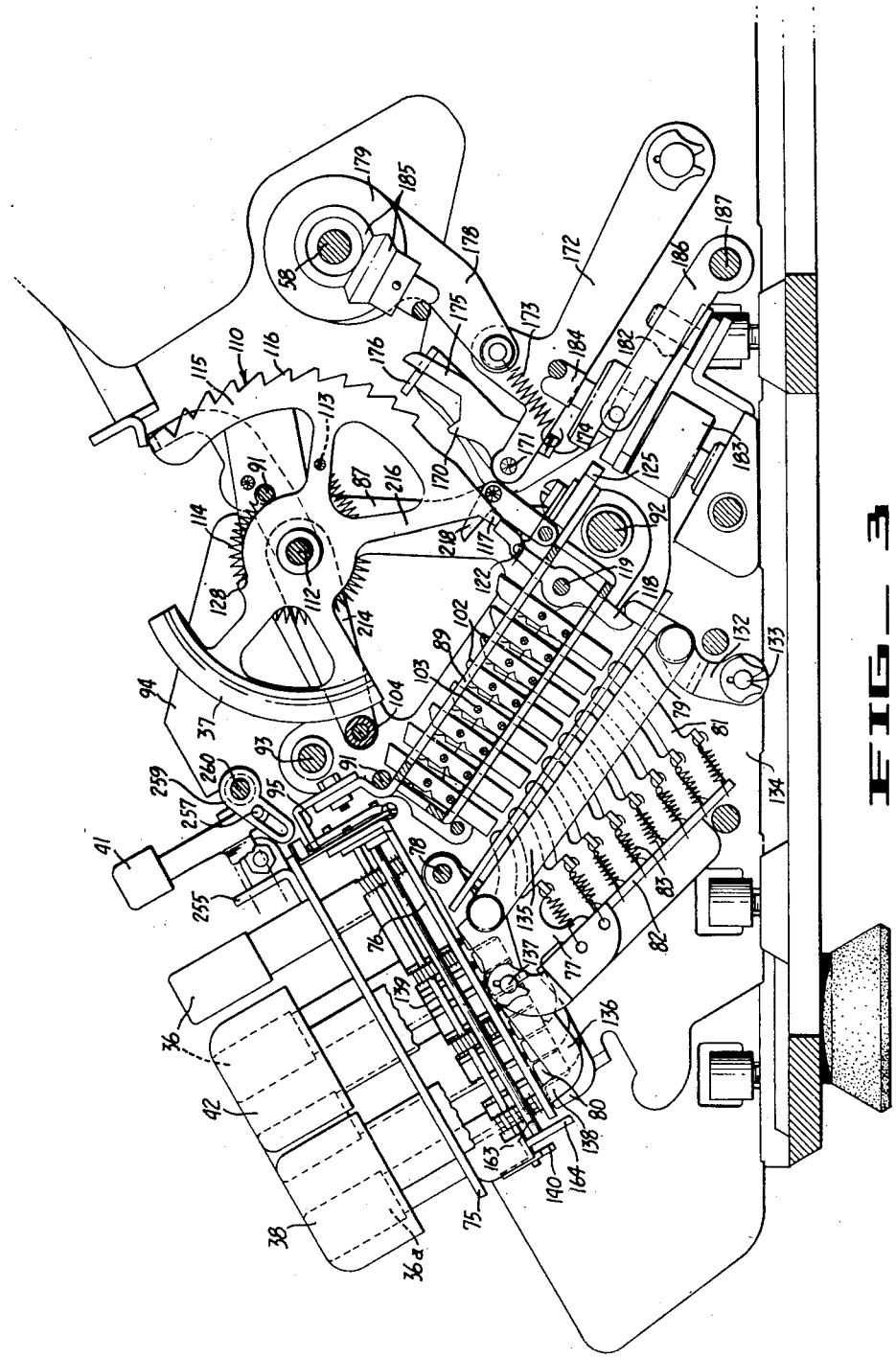

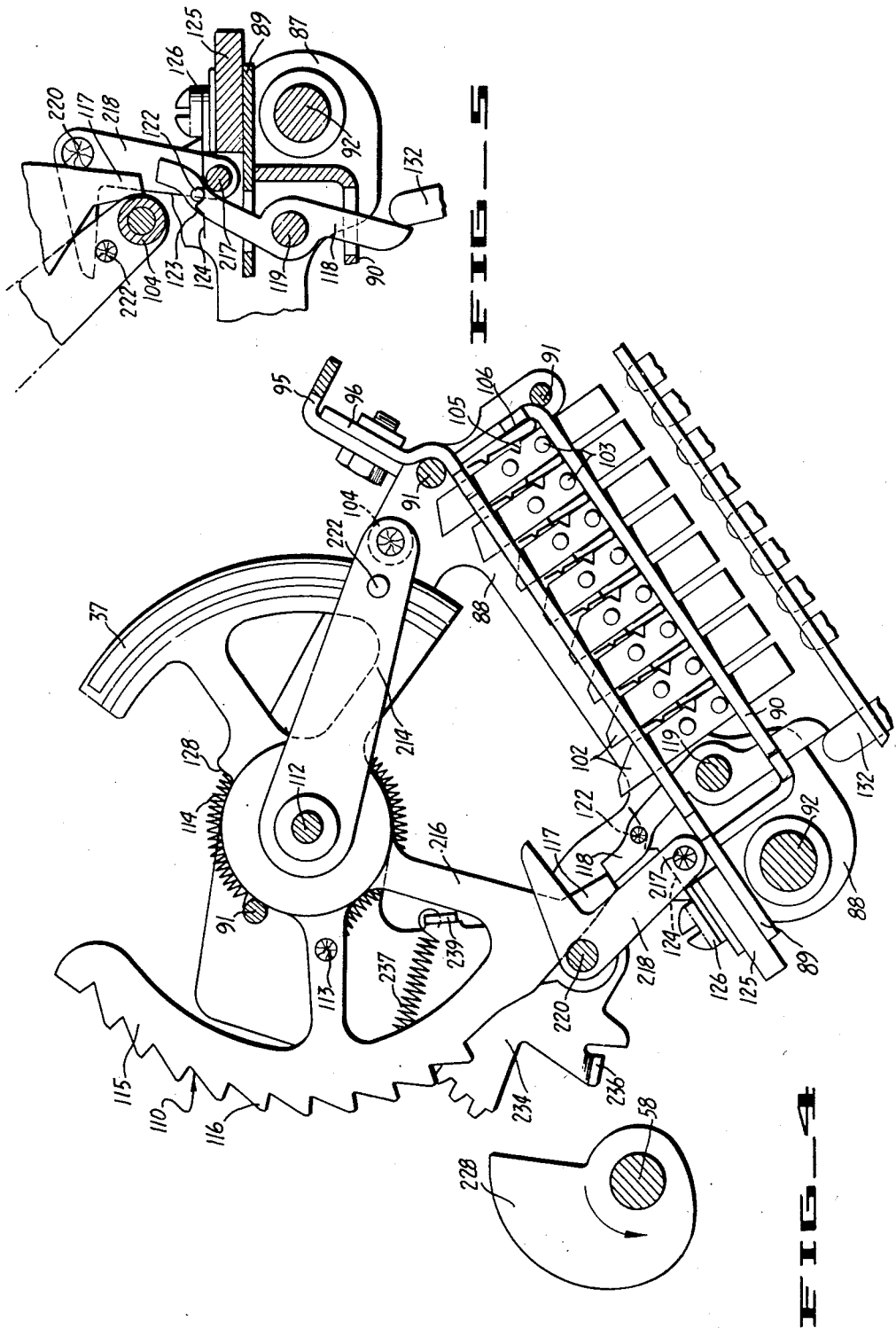

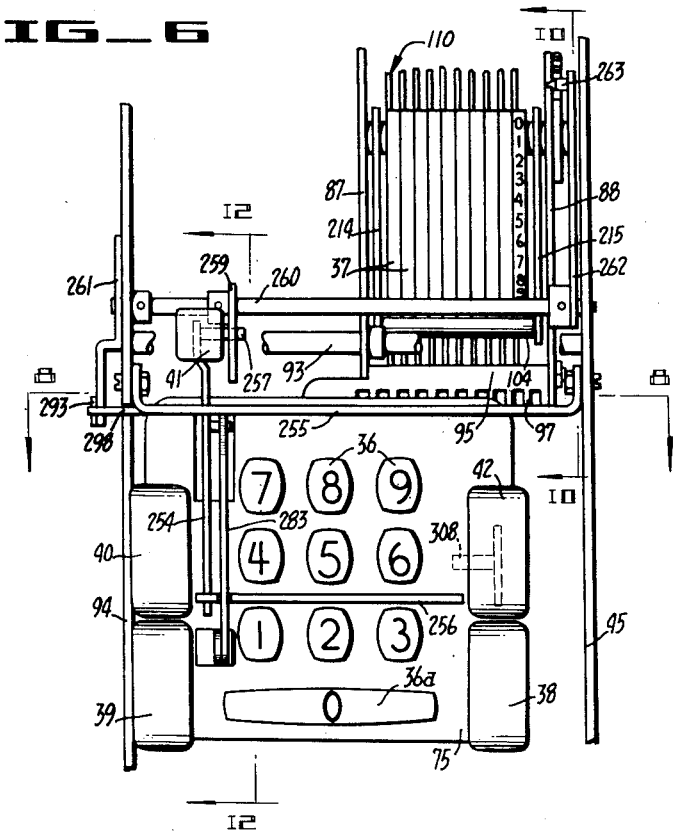
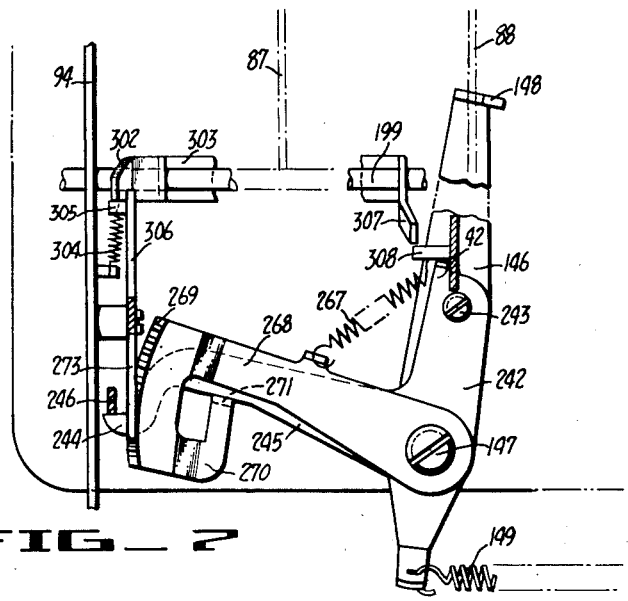

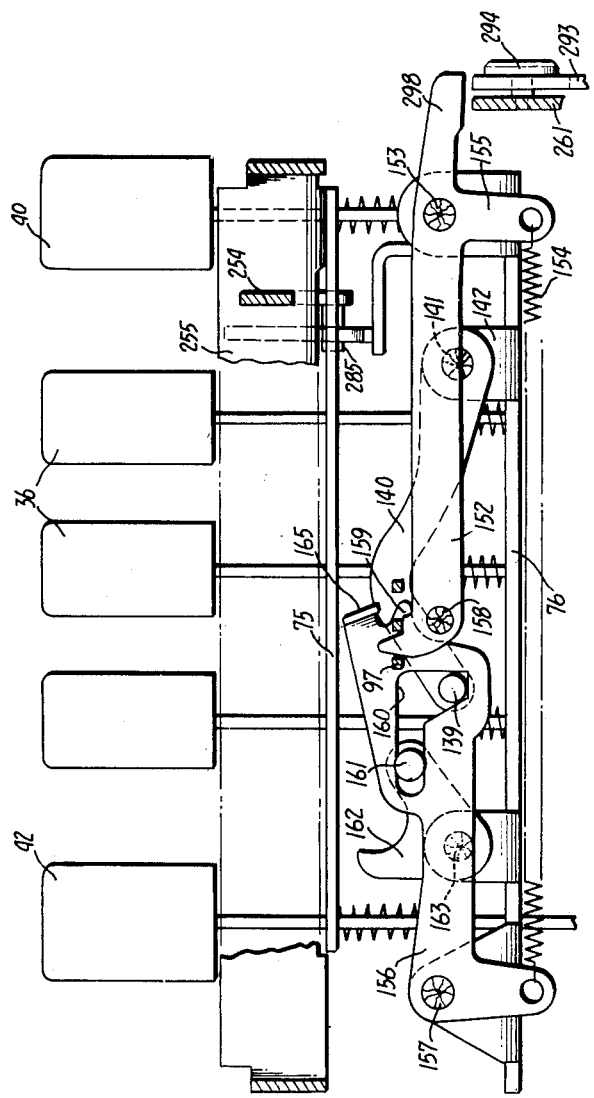

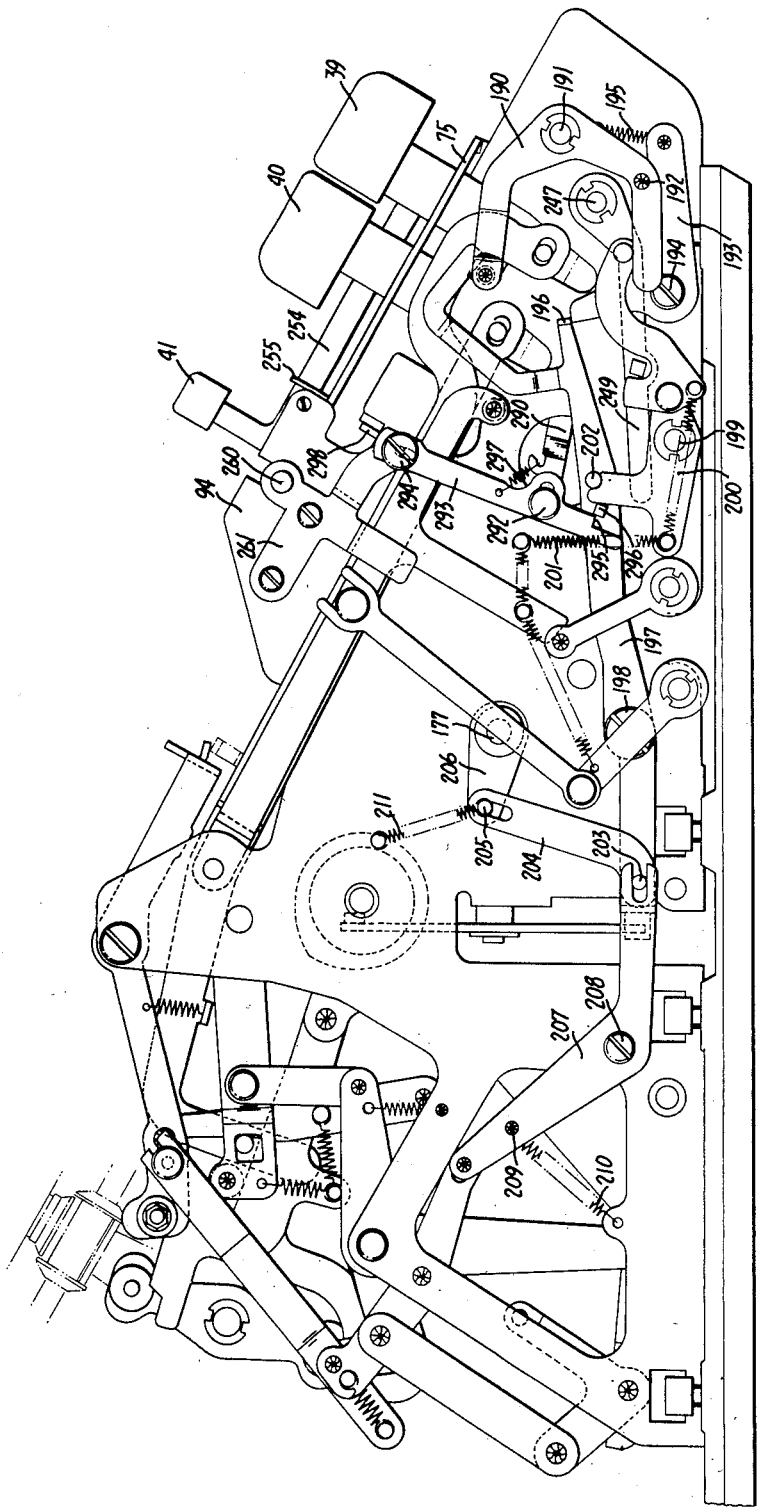

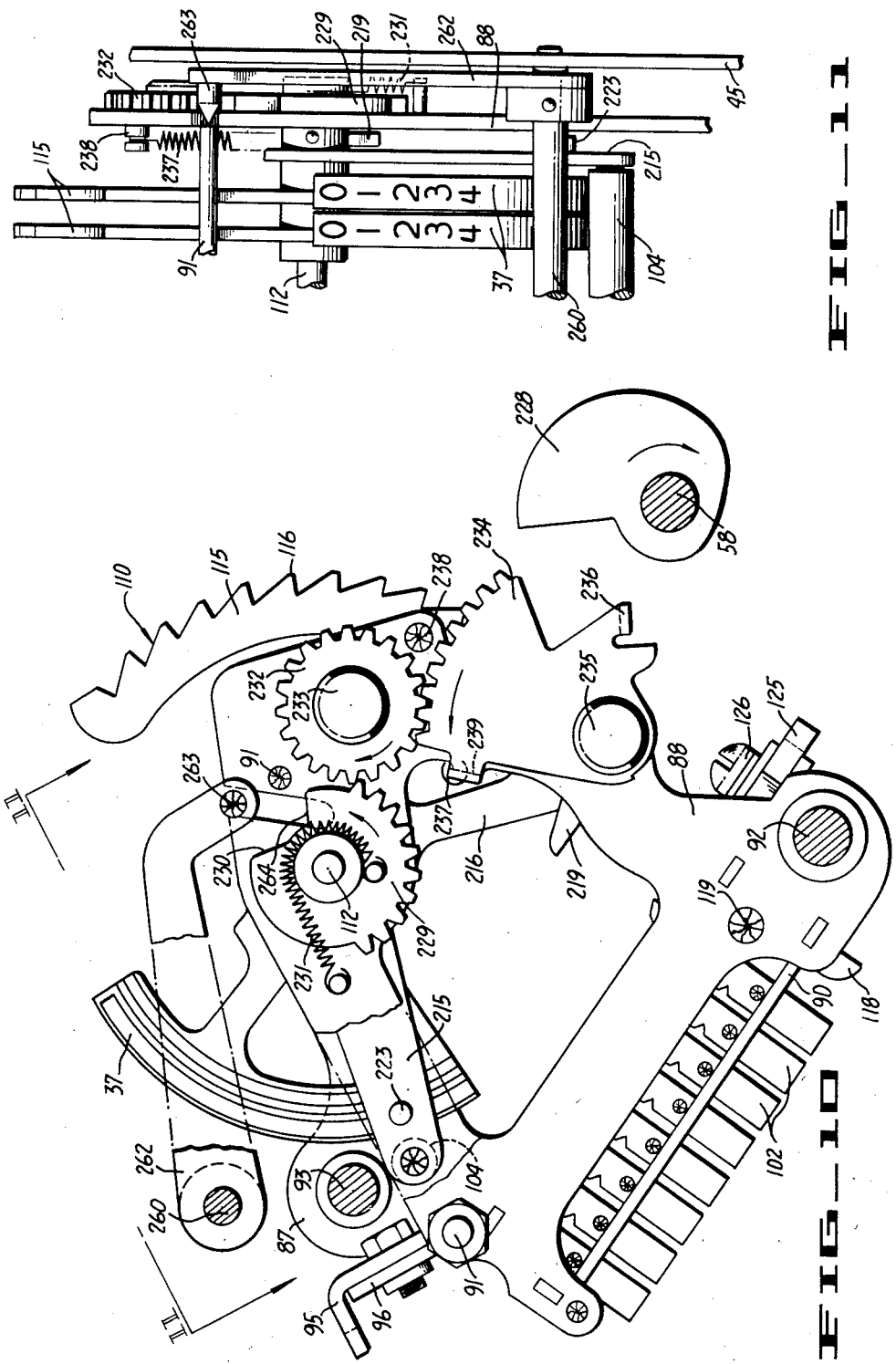

June 4, 1957 G. C. ELLERBECK 2,794,595
CALCULATING MACHINE
Filed June 21, 1955 9 Sheets-Sheet 9
FIG_12
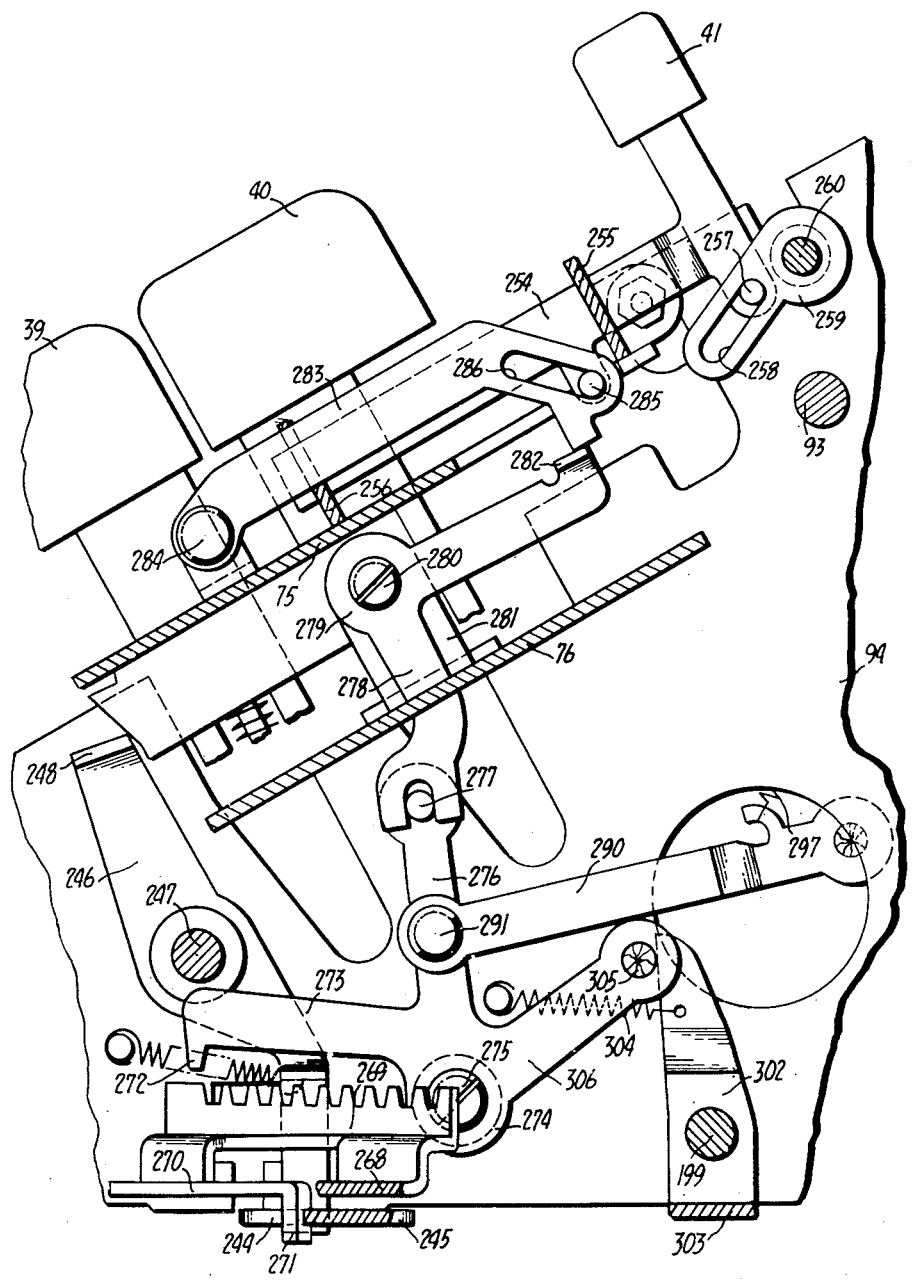

United States Patent Office 2,794,595
Patented June 4, 1957

2,794,595

CALCULATING MACHINE

Grant C. Ellerbeck, San Leandro, Calif., assignor to Friden Calculating Machine Co., Inc., a corporation of California Application June 21, 1955, Serial No. 516,826

6 Claims. (Cl. 235—63)

This invention relates to calculating machines and is concerned more particularly with a provision of improved means for performing plural order multiplication operations.

It is an object of the invention to provide an improved calculating machine in which a multiplier factor may be selectively re-entered automatically into the machine for use in a plurality of multiplication operations.

Another object of the invention is to provide an improved multiplier selection mechanism for a calculating machine in which a multiplier factor may be entered automatically for repeat plural order multiplying operations.

Another object of the invention is to provide a calculating machine with an improved multiplier mechanism in which a multiplier factor is cleared out of selection at the conclusion of a plural order multiplication operation.

Another object of the invention is to provide a calculating machine with an improved plural order multiplication control mechanism which is selectively conditioned for repeat operations.

Other objects and advantages of the invention will be apparent from the following description of a preferred embodiment as illustrated in the accompanying drawings in which:

Fig. 2 is a longitudinal sectional elevational view of the rear portion of the machine.

Fig. 3 is a sectional elevational view of the multiplier selection mechanism, the view being taken on the line 3—3 in Fig. 1.

Fig. 4 is an elevational view of the multiplier pin carriage with the left side plate removed.

Fig. 5 is a sectional elevational detail of a multiplier segment latch.

Fig. 6 is a plan view of the multiplier selection mechanism.

Fig. 7 is a plan view taken below the multiplier keyboard showing a portion of the repeat multiplier mechanism.

Fig. 8 is an enlarged view of the escapement mechanism for the multiplier selection carriage located at the rear of the multiplier keyboard, the view being taken on the line 8—8 in Fig. 6.

Fig. 9 is an elevational view of the left side of the machine.

Fig. 10 is an elevational view of the multiplier selection carriage as viewed from the right showing the restoring mechanism for the selection segments, the view being taken on line 10—10 of Fig. 6.

Fig. 11 is a partial plan view of the multiplier carriage in its rightmost or inactive position, the view being taken on the line 11—11 of Fig. 10.

Fig. 12 is a fragmentary sectional elevational view of the right side of the left side frame of the machine, the view being taken on the line 12—12 of Fig. 6.

*General description*

Figure 1:
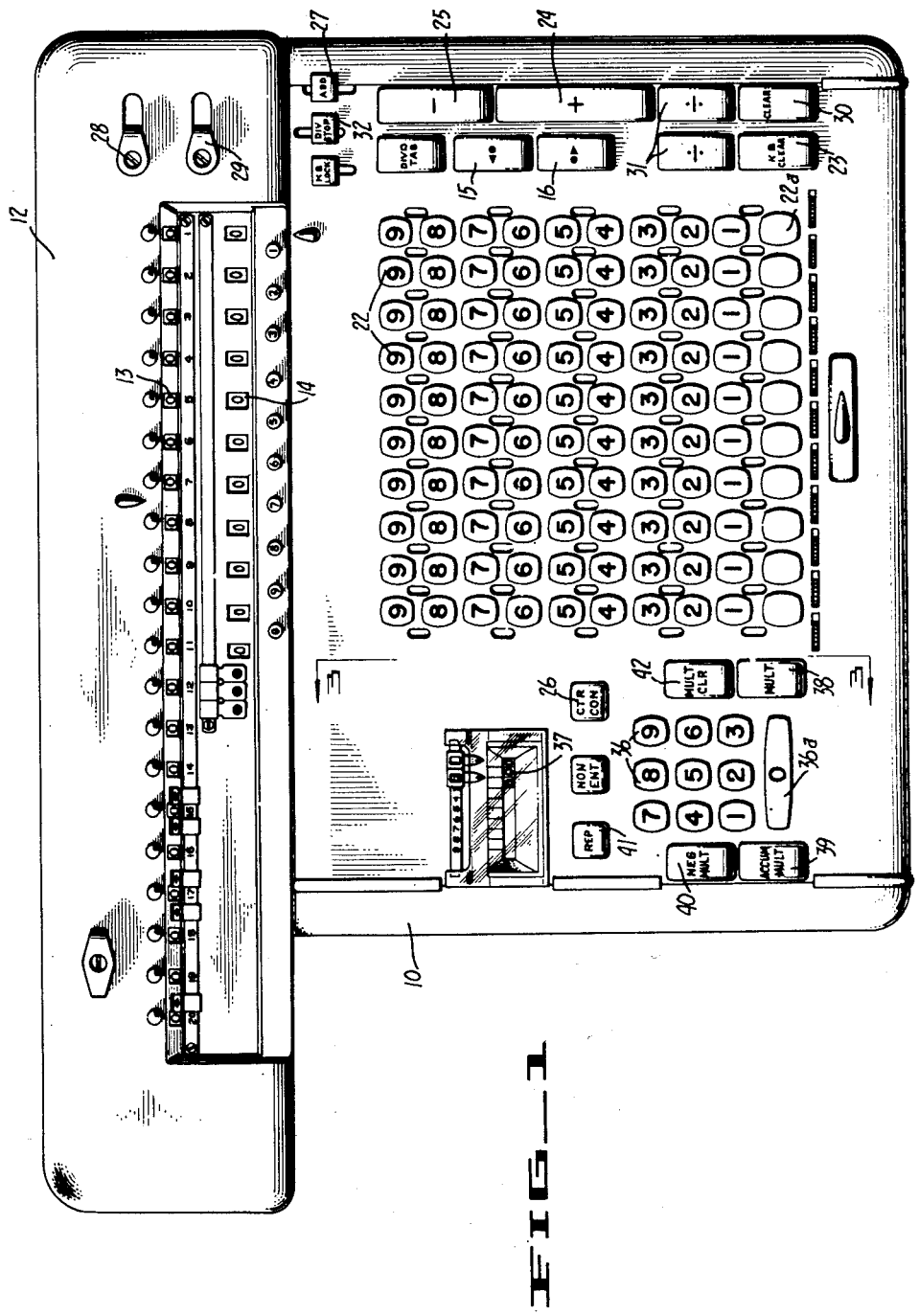
Fig. 1 is a plan view of the machine.

The invention is described in a preferred form as adapted to a Thomas type calculating machine as illustrated, for example, in the patents to Friden, Nos. 2,229,889 and 2,371,752, and the patent to Friden et al. No. 2,399,917.

Referring to Fig. 1, the machine includes a base and casing 10 suitably secured thereon and in which the actuating, selecting, and control mechanisms are mounted. Register carriage 12 is mounted for endwise shifting movement transversely of the machine, and carries numeral wheels 13 and 14 of the accumulator and revolutions counter respectively. Carriage 12 can be shifted by power in either direction by manipulation of respective shift keys 15, 16 in a well known manner.

Values are entered into the machine by depression of numeral keys 22 of the usual keyboard in the various ordinal rows thereof. Keys 22 being releasable individually by depression of ordinal clear keys 22a or collectively by depression of keyboard clear key 23. Values introduced into the machine may be registered additively or subtractively on accumulator wheels 13 by depression of plus key 24 or minus key 25, respectively, while the number of registrations, or the complement thereof, can be entered in counter numeral wheels 14 by proper setting of control lever 26. If desired, "add" key 27 may be selectively manipulated to cause clearing of the keyboard in the usual manner after a single registration in the accumulator.

Values registered in numeral wheels 13 and 14 may be cleared out, i. e., the registers can be zeroized by manipulation of respective manually operable resetting knobs 28, 29 or by power through depression of return and clear key 30. Depression of key 30 first effects return of carriage 12 to its leftmost position and subsequently effects selective resetting of either or both accumulator numeral wheels 13 and counter numeral wheels 14 as determined by the setting of the knobs 28, 29 from the normal position shown.

The machine is adapted to perform automatic plural order division by means of conventional construction including division control keys 31 and division stop lever 32 by means of which a division operation can be terminated at the end of any selected ordinal division. Automatic predetermined multiplication can also be performed by depression of multiplier selection keys 36 to set up the desired multiplier figure as indicated on the dials 37 and by depression of one of the multiplication control keys 38, 39, or 40 to start the multiplying operation. Where repeated use of the multiplier factor is desired, repeat key 41 is moved forwardly so that a factor previously entered by keys 36 is retained for subsequent use, as will be described hereinafter. It it is desired to correct an erroneously entered multiplier factor, a multiplier correction key 42 may be depressed to zeroize the multiplier selection mechanism. Similarly, upon restoration of repeat key 41 to its normally inactive position, depression of the multiplier correction key 42 is effective to remove a "repeat" multiplier factor from the selection mechanism. The zeroization of the multiplier selection mechanism and the associated repeat control means, form the principal subject matter of the instant invention and are described later in detail.

Within casing 10, the frame includes a right side frame (not shown) and a left side frame 45 (Fig. 2) which are suitably mounted on the base and are interconnected by various transverse members or brackets 46, 47, 48, 49, and 50 for supporting various mechanisms including the selecting and actuating mechanisms.

The values to be introduced into accumulator numeral wheels 13 are selected by means of a plurality of similar orders of selecting mechanism associated with numeral keys 22. For this purpose, each bank or order of keys 22 (Fig. 2) cooperates with a pair of similar parallel spring-urged value selecting slides 51, 52 mounted for endwise movement by a suitable supporting linkage for operation in a conventional manner. Each slide 51, 52 is provided with cam surfaces of varying inclination for cooperation with suitable pins on keys 22 to effect a differential movement of slides 51, 52 upon depression of keys 22. Slide 51 of each order cooperates with the "1" to "5" keys 22 of a bank while the other slide 52 of an order cooperates with the "6" to "9" keys 22 of the bank.

Each bank of keys 22 has a latching slide 53 of conventional construction associated therewith to latch any depressed key 22 releasably in depressed position against the tension of the spring associated therewith. To release depressed numeral keys, the latching slides 53 may be operated in any convenient manner by ordinal clear keys 22a or keyboard clear key 23 and by power as determined by the selective setting of "add" key 27.

Each selecting slide 51, 52 (Fig. 2) is connected at its rear end with a ten tooth gear 54 slidably and nonrotatably mounted on longitudinal square shaft 55 whereby movement of either slide serves to position the associated gear 54 on shaft 55 with respect to stepped teeth of the associated actuating cylinder 56, in accordance with the value of the depressed numeral key 22. A pair of actuating cylinders 56 for adjacent orders of the machine are mounted on each longitudinal actuator shaft 57 which is suitably journalled in transverse frame members 46 and 48 and has a suitable beveled gear connection with transverse drive shaft 58. Shaft 58 is driven cyclically in a single direction from a motor driven clutch controlled driving means of the usual type.

As seen in Fig. 2, the pair of square shafts 55 associated with each actuator shaft 57 are positioned above and to either side thereof while the sets of gears 54 on respective square shafts 55 are offset longitudinally of the machine for cooperation with the similarly offset actuating cylinders 56. By the above arrangement, and upon each rotation of the actuating means, a selected number of increments of movement can be imparted to each shaft 55 by the associated actuating cylinder 56 in accordance with the adjusted position of gears 54.

Each shaft 55 is suitably journalled in transverse frame members 46, 47, and 49 and between members 47 and 49 has associated therewith, selectively settable plus-minus gears for driving an aligned numeral wheel 13. The plus-minus gears of each order of the machine include a spool 64 slidably and nonrotatably mounted on shaft 55 and having opposed ten tooth bevel gears 65, 66 arranged for selective engagement with gear 67 on numeral wheel shaft 68. The engagement of gears 65 or 66 with gear 67 is controlled by gate 69 which extends transversely of the machine between each set of plus-minus gears 65, 66 and is mounted by similar spaced arms 70 on transverse shaft 71 which is suitably journalled in the right and left side frame members. Shaft 71 is controlled in a well known manner to determine positive registration by meshing gears 65 with gears 67 and negative registration by meshing gears 66 with gears 67. In the neutral position shown in Fig. 2 in which gears 65 and 66 may be held normally by suitable spring-urged centralizing means associated with gate 69, carriage shifting can be effected.

During both additive and subtractive registration of values in numeral wheels 13, suitable transfer mechanism of conventional construction may be operative to effect the tens-transfer as disclosed, for example, in said Patent No. 2,229,889.

*Multiplication mechanism*

The multiplication mechanism disclosed herein, comprises means for performing predetermined plural order multiplying operations in which the respective multiplicand and multiplier factors are entered into the machine by respective keyboards. The respective keyboards, with their associated mechanism, control the operation of the machine to perform the multiplication in accordance with the depression of the positive or negative multiplication keys to determine the sign character of the registration of the product in the accumulator. As is usual, in this type of a machine, a multiplicand keyboard comprises the conventional keyboard of the calculator which is used in other operations, while the multiplier keyboard is preferably of the so-called "ten-key" type which may be operated to set up successively the various digits of the multiplier.

Generally, the selection mechanism for the multiplier comprises a keyboard which, as shown, is of the "ten-key" type and a pin carriage associated therewith having ten ordinal rows of settable stop pins and ten ordinal differentially adjustable elements in the form of racks in which digits of the multiplier may be set successively for subsequent control of the multiplying operation. In order to set up the multiplier digits, each pin row includes eight pins corresponding to the "1" to "8" keys and a fixed stop corresponding to the "9" key so that a depressed multiplier key operates through an associated selection lever to set the corresponding pin of an aligned ordinal row to active position. At the same time that a pin of the pin carriage is moved to active position, the aligned rack is released to move into engagement with a pin and thereby be set differentially in accordance with the value of the depressed key. Subsequently, the depressed key operates an escapement mechanism to move the pin carriage one ordinal step with respect to the keyboard selection mechanism. In this manner, as will be apparent from the following detailed description, the multiplier digits are set up in the multiplier selection mechanism, the setting operation beginning with the highest order digit of the multiplier in the embodiment illustrated.

Referring to Fig. 1, multiplier keys 36 from "1" to "9" are arranged in a square in 3 x 3 relation with "0" key 36a located forward of the "1" to "9" keys. Keys 36 and 36a are slidably mounted in upper and lower plates 75 and 76 (Fig. 3) of the multiplier keyboard and a suitable spring is provided on each key stem to urge the key to its upper position where the offset portion thereof engages the lower surface of the upper plate 75. The respective offset portions of keys 36 are in parallel aligned relation for operating the multiplier escapement mechanism which is referred to hereinafter. The "1" to "8" keys 36 also have their lowermost portions aligned in staggered fashion below plate 76 for cooperation with a row of selection levers for setting the pin carriage mechanism. A selection lever 77 (Fig. 3) is provided for each of the "1" to "8" keys 36. Each lever 77 is pivoted on transverse shaft 78 which is suitably supported in the frame and each lever 77 is guided in a slot in plate member 79. Levers 77 are provided with upwardly projecting noses 80 disposed in an aligned relation with the multiplier keys for operation thereby.

Each selection lever 77 is also provided at its lower end with an upwardly and rearwardly projecting pin setting finger. Each lever 77 normally seats against bracket 82 under the influence of a spring 83 tensioned between the bracket 82 and the lever. The fingers 81 of the various levers 77 are disposed in a row and extend through a suitable aperture in plate 79.

For a more complete description of the multiplier keyboard and the selection mechanism controlled thereby, reference is to be had to the aforementioned Patent No. 2,399,917.

As explained above, the shiftable pin carriage which controls the multiplying operation, carries the ordinal rows of settable pins by means of which the multiplier digits are set into the machine as well as the differentially settable racks which are adjusted in accordance with the setting of the active pins, and consequently the value of the multiplier digits. The machine illustrated has ten orders of pin rows and racks to provide for entry of a corresponding number of multiplier digits. When adjusted, the racks serve to display the selected multiplier value and thereafter are returned successively in step-by-step fashion to their initial positions, and during such return control the operation of the mechanism in accordance with the successive multiplier digits.

The pin carriage frame comprises spaced-apart similar side plates 87 and 88 (Figs. 3, 4 and 6) and respective upper and lower pin holding plates 89 and 90 extending between the lower ends of side plates 87, 88 and having suitable end projections engaging corresponding slots in the plates. The frame assembly is held together by a plurality of similar tie rods 91. The pin carriage is mounted for transverse movement in the machine on rods 92 and 93 supported at their ends in side frame members 45 and 94. To control the escapement of the pin carriage, escapement rack bracket 95 is secured by a plurality of suitable bolts on an extension 96 of upper pin plate 89 and is provided at its forward edge with teeth 97 which cooperate with a step-by-step escapement mechanism to be later described.

Referring to Figs. 3 and 4 pin plates 89 and 90 of the pin carriage are provided with a series of rows of aligned slots to receive pins 102 for limited endwise sliding movement as determined by spaced apart extrusions 103 thereon between plates 89 and 90. With the ordinal escapement of the pin carriage to the left (as viewed in Fig. 6) each ordinal row of pins 102 from the highest order to the lowest order is positioned relative to the aligned row of pin-setting fingers 81 for selective adjustment thereby, as determined by the numeral key depressed. The upper ends of the pins 102 are of varying length to allow free movement of the associated settable rack past those pins which are in their lower inactive position. The tops of the pins 102 are beveled in varying degrees to provide a camming action upon engagement by a transversely extended roller 104 to effect simultaneous restoration of the actively set pins to their lower inactive position as will be described hereinafter.

In order to latch a pin 102 (Figs. 3 and 4) in raised position, each pin is provided with latching notch 105 for cooperation with a V-shaped end portion of a slotted U-shaped spring plate 106 which is compressed between adjacent pins 102 of a row and is held in place between side plates 87 and 88. A plate 106 is provided to cooperate with each transverse series of pins in the respective rows.

For each order of settable pins, the carriage is provided with a differentially settable element in the form of a pivoted spring actuated rack which is normally held in its "0" position and which can be released to assume a differential adjustment in accordance with the pin of the associated row which is moved to active position by depression of a selected multiplier key. For this purpose, a plurality of ordinal axially aligned rack segments 110 (Figs. 3 and 4) are provided between side plates 87 and 88. Each rack segment 110 is secured to a hub journalled on spacer shaft 112, the reduced ends of which are journalled in respective side plates 87, 88. Each hub is of a length such that the rack segments 110 are maintained in ordinarily aligned relation to the corresponding pin rows. Each rack segment 110 is provided with a pin 113 from which spring 114 extends around the associated hub to transverse rod 91, whereby each segment 110 is urged in a clockwise direction (as viewed in Fig. 3) or counter-clockwise (as viewed in Fig. 4) by its associated spring.

Each rack segment 110 (Figs. 3 and 4) is provided with an arcuate rack sector 115 having eleven teeth 116 spaced from the lower, or stop, end 117 which normally engages the upper end of a latching pawl 118. The series of pawls 118, one for each rack segment 110, extend in both directions through slots in upper and lower pin holding plates 89 and 90 and are pivotally mounted on spacer shaft 119 secured at its ends in side plates 87, 88. Adjacent the upper end thereof, each pawl 118 (Fig. 5) carries a detent pin 122 for cooperation with a V-shaped portion 123 of a spring detent plate 124 mounted on pin carriage shift rack 125 by any suitable means such as screws 126 which serve to secure plate 124 and rack 125 on the rearwardly extending portion of upper pin plate 89. In the detented position shown in Figs. 3 and 4 pawls 118 normally maintain rack segments 110 in their "0" position.

Opposite rack sector 115 (Figs. 3 and 4) each segment 110 is provided with an indicating dial 37 bearing numerals from "0" to "9," one of which becomes visible through a suitable sight opening in case 10 (Fig. 1) to display the value of a multiplier digit set into the machine in accordance with the adjusted position of the segment. For the values "1" to "8" such adjusted position is controlled by the active pin 102 aligned therewith while for the "9" position shoulder 128 of the upper supporting spoke for the dial engages transverse shaft 91, on which one end of springs 114 are secured, to stop the respective rack segments in the "9" position thereof.

Means is provided for releasing rack segment 110 of the active order of the pin carriage simultaneously with the movement of a related pin to active position. To release rack segment 110 the associated pawl 118 is moved to inactive position by means of arm 132 (Fig. 3) pivoted at 133 on auxiliary side frame 134 and having its upper end operatively related to the lower end of the aligned latching pawl 118. Intermediate its ends, arm 132 is connected by link 135 with lever 136 pivoted at 137 on bracket 82 and having finger 138 at its forward end formed upwardly to extend through lower keyboard plate 76 to a position underlying rod 139 extending between similar spaced arms 140 (Figs. 3 and 8) secured at the ends of rod 141 pivoted in suitable upturned ears 142 of lower plate 76. Upon depression of any multiplier key 36, rod 139 will be moved downwardly in a well known manner to engage finger 138 and thereby impart a counter-clockwise rotation to lever 136. This resulting movement of lever 136 (Fig. 3) serves through link 135 to rock arm 132 and move the aligned pawl 118 to its inactive position whereby the associated rack segment 110 is released at the same time that pin setting extension 81 of selection lever 77 becomes active to project a pin 102 into active position. Upon clockwise rocking of a pawl 118 (Figs. 3 and 5) to release the associated segment 110, V-shaped portion 123 of the corresponding spring detent 124 serves in cooperation with pin 122 of the pawl to retain the pawl in its inactive position as seen in Fig. 5 until restored to active position by means to be hereinafter described.

The above described mechanism is generally similar to that disclosed in the afore-mentioned Patent No. 2,371,752 and is operated by successive depression of multiplier keys 36 so that racks 110 are set successively to the selected value. The pin carriage shifting one step to the left, as viewed in Fig. 6, for each depression of a multiplier key.

As previously explained, the pin carriage is movable step-by-step transversely of the machine in accordance with the number of multiplier digits entered therein. The pin carriage is normally in its right end position (Fig. 6) as viewed from the front of the machine, with indicating dials 37 to the right of and not visible through the sight opening in the machine casing 10. The condition shown in Fig. 1 would obtain after three successive depressions of "0" key 36a to move the pin carriage toward its left end position so that three of the dials 37 are in value displaying position. The pin carriage is spring-urged toward its left end position by means of horizontally disposed lever 146 (Fig. 7) which is pivoted at 147 on the base of the machine and has upstanding arm 148 at one end thereof engaging right side plate 88 of the pin carriage shown in phantom line. At its other end, lever 146 carries one end of spring 149, the other end of which is secured to the right side frame of the machine and serves to urge the lever in a counter-clockwise direction, as viewed in Fig. 7, and correspondingly the pin carriage is urged from its right end or "home" position which it occupies when no multiplier value is set in the machine.

Normally the movement of the pin carriage under the influence of spring-urged lever 146 is prevented by means of escapement stop pawl 152 (Fig. 8) pivoted at 153 on an upstanding ear formed on the lower keyboard plate 76 and having the nose thereof urged upwardly into engagement with a tooth 97 of rack 95 by spring 154 secured at its one end in depending arm 155 of pawl 152 and at its other end in one arm of bellcrank 156 pivoted at 157 on an ear formed at right angles to lower keyboard plate 76. Pawl 152 carries pin 158, which lies beneath ear 159 formed at the end of the horizontal arm of bellcrank 156. Bellcrank 156 is provided with an L-shaped slot 160, the horizontal portion of which receives pin 161 carried by arm 162 on one end of rod 163 journalled in spaced-apart ears on lower keyboard plate 76. At its other end, rod 163 carries arm 164 (Fig. 3) underlying one end of rod 139 to be operated thereby. The vertical portion of L-shaped slot 160 receives the other end of rod 139, as seen in Fig. 8. The horizontal arm of bellcrank 156 also carries laterally projecting tooth 165 which is normally positioned immediately above teeth 97 under the urgency of spring 154 and is disposed for downward movement between the pair of teeth adjacent, and to the right of, that contacted by the nose of pawl arm 152.

Preferably, the escapement shift is performed in two stages. One stage occurring during depression of a multiplier key and the last stage occurring just before return of the key to raised position. When the multiplier key is depressed, shaft 163 (Fig. 8) is rocked clockwise by virtue of the fact that its arm 164 underlies key operated rod 139 whereby arm 162 and pin 161 serve to rock bellcrank 156 about its pivot in a clockwise direction thereby simultaneously lowering tooth 165 of bellcrank 156 into a position between the two adjacent teeth 97 to the right of the tooth 97 engaged by the nose of stop pawl 152. During continued movement of bellcrank 156, its ear 159 engages pin 158 and rocks escapement stop pawl 152 counter-clockwise to disengage the nose thereof from the associated tooth 97. As soon as the nose of the pawl 152 is disengaged from a tooth 97, the first stage of the shift step occurs and the pin carriage moves to the right as viewed in Fig. 8, or the left as viewed in Fig. 6, under the influence of the spring-urged lever 146 (Fig. 7) until a rack tooth 97 engages tooth 165 of bellcrank 156.

The movement of the pin carriage during this stage of a shift step corresponds to the space between the tooth 165 and the rack tooth 97 adjacent thereto, the movement being sufficient to position a previously active tooth 97 over the nose of pawl 152 but insufficient to allow engagement of the projected finger 81 (Fig. 3) with an inactive pin in the adjacent pin row. Subsequently, as a depressed multiplier key is released, the parts start their return from depressed position. Stop pawl 152, however, is held depressed by the associated tooth 97 and cannot return upwardly with the other parts until the inclined face of tooth 165 has permitted shifting of the pin carriage for an amount to move the associated tooth 97 from over the nose of the pawl 152 so that the nose will work upwardly into engagement with the next tooth 97 to the left of the tooth with which it was engaged before depression of the multiplier key. Shortly before the depressed key is returned to its upper position, the one-step shift is completed whereby all of the pin setting and escapement shift parts will also be restored to normal position and the carriage will be conditioned for subsequent shifting movement.

From the foregoing description, it will be seen that each time a multiplier key is depressed, the aligned rack segment and selected pin of the pin carriage are set, while at the same time the carriage is escaped one step toward the left of the machine to display the set figure through the multiplier sight opening. This operation is repeated as the various digits of the multiplier are set into the machine. If a mistake is made in setting the multiplier digit into the pin carriage, such error can be corrected by resetting the multiplier racks, as will be described hereinafter.

As previously stated, the differentially adjusted positions of racks 110 are ultilized to control the number of registrations of the multiplicand in the accumulator, to shift the accumulator to the right after the multiplication by each multiplier digit to enable correct registration of the next ordinal product, as well as to shift the pin carriage so that the next higher order rack 110 comes into controlling position wtih respect to the operation of the machine.

The operating mechanism for the racks 110 is conventional and comprises feed pawl 170 (Fig. 3) which, with the pin carriage in its right-hand position, is located one ordinal step to the left thereof, as viewed in Fig. 6. As each rack is adjusted by depression of a multiplier key and the pin carriage escapes one step to the left, the adjusted rack moves into alignment with the actuating pawl 170. Thus, after the complete multiplier is set into the machine, the last adjusted rack 110, corresponding to the lowest digit of the multiplier, will always be aligned with pawl 170 at the end of the multiplier setting operation.

Pawl 170 is pivotally secured at 171 on the end of arm 172 suitably pivoted on auxiliary frame member 134. Pawl 170 is urged in a counter-clockwise direction, as viewed in Fig. 3, by a spring 173 tensioned between a pin on arm 172 and a lug 174 of pawl 170 which engages beneath arm 172 to limit the movement of pawl 170 under the influence of the spring. Lug 174 is spaced from arm 172 in the inactive position of pawl 170 and engages arm 172 to limit the rocking movement of the pawl upon movement to active position. Pawl 170 is held in inactive position by its upward extension 175 engaging behind the holding pawl 176, which is secured at the end of shaft 177 (Fig. 9) which is suitably pivoted in side frame members 94 and 134. Both pawls 170 and 176 are maintained inactive until the multiplying operation is started, the inactive position being shown in Fig. 3.

In order to actuate pawl 170, arm 172 is pivotally connected to pitman 178 which engages an eccentric cam (not shown) secured on main drive shaft 58 between similar disks 179. Pitman 178 and arm 172 are reciprocated once for each cycle or rotation of shaft 58 to control the operation of the pawl 170 in its active direction occurring at the beginning of each cycle. However, the pawl 170 is held in inactive position until holding pawl 176 is allowed to move in a counter-clockwise direction from the position shown in Fig. 3 by oscillation of shaft 177 upon initiation of a multiplication operation. During a multiplying operation, pawl 170 is operated to restore the aligned rack step-by-step to its inactive or "0" position. Rack 110 is always actuated one step more than the value to which it is set, to provide for the shift cycle at the end of each ordinal multiplication. The last movement of the active rack at the end of its return to tis "0" position enables holding pawl 176 to be rocked clockwise (Fig. 3) thereby returning actuating pawl 170 to its inoperative position relative to the associated rack as well as to control and determine shifting of the accumulator and the pin carriage to align the next higher order rack 110 with the pawl 170, as described in said patents.

Referring to Fig. 3, pin carriage shift rack 125 is adapted for operation by an operating pawl 182 carried by an eccentric portion of collar 183 which is slidable on, and driven by, shaft 184 through bevel gearing 185 from main drive drive shaft 58. Collar 183 normally positions pawl 182 below rack 125, as seen in Fig. 3, but the collar and the pawl can be raised by the operation of a suitable arm 186 upon clockwise rocking movement of shaft 187 to lift pawl 182 into the plane of rack 125 and effect a one-step shift of the pin carriage during a multiplying operation. The shifting of the pin carriage toward the right, as viewed from the front of the machine, is controlled in the course of a multiplying operation as described fully in the afore-mentioned Patents Nos. 2,371,-752 and 2,399,917.

The multiplication keys 38, 39, and 40 (Figs. 1 and 6) and the mechanisms controlled thereby, are of the character disclosed in said Patent No. 2,399,917 and so will not be described in detail herein. It is sufficient, for the purposes of the present invention, to understand that depression of either key 38, 39, or 40 initiates a left shift operation of the accumulator to its leftmost position as viewed from the front of the machine and, upon depression of key 38, to effect a zeroizing of the accumulator. A depression of any one of these keys also is effective to impart a counter-clockwise rotation to U-shaped member 190 (Fig. 9) secured on shaft 191 journalled in side frame members 45 and 94 which, through pin 192 on member 190, serves to rock bellcrank 193 clockwise about its pivot 194 on frame member 94 against the urgency of spring 195 to remove the vertical arm of bellcrank 193 from its normal latching engagement with ear 196 formed at right angles to the forward end of multiplication setting lever 197 pivoted at 198 on side frame member 94. Setting lever 197 is, however, retained in its inactive postion by latch lever 200 secured on shaft 199 journalled in frame members 45 and 94. Upon the accumulator reaching its leftmost position, latch lever 200 is rocked in a counter-clockwise direction, as viewed in Fig. 9, by the left shift mechanism against the urgency of spring 201 to remove the latch lever 200 from active engagement with pin 202 on setting lever 197. At its rearward end, setting lever 197 has a pivotal connection 203 with the lower end of link 204 having pin and slot connection 205 with arm 206 secured on shaft 177 which, it will be recalled, also carries holding pawl 176 (Fig. 3). Setting lever 197 is rocked to active position by bellcrank 207 pivoted at 208 on frame member 94 having one arm which is provided with a bifurcation embracing pin 203 on lever 197 while the other arm carries pin 209 which supports one end of spring 210 the other end of which is secured in frame member 94. Upon release of latch lever 200 from pin 202, spring 210 becomes effective to rock setting lever 197 clockwise (Fig. 9) and through link 204 enables spring 211 to rock arm 206 and shaft 177 clockwise, or counter-clockwise as viewed in Fig. 3, to initiate operation of the multiplying mechanism and effect a step-by-step return of the ordinarily adjusted racks 110 in sequence from the lowest order rack to the highest order rack, with a one-step right shift of the accumulator and of the pin carriage occurring between each ordinal multiplication. Certain parts of this multiplication control mechanism are shown in Fig. 9 for a better understanding of the relation of the instant invention to the conventional parts of the multiplication mechanism.

In the event a correction of a multiplier factor is required because of erroneous setting, multiplier correction key 42 (Figs. 1 and 6) is depressed to control that portion of the multiplication operation control means which enables the drive mechanism to restore the adjusted racks of the pin carriage and to return the pin carriage to its normal inoperative position.

It will be recalled, that upon depression of a multiplier key 36, and subsequent to the setting of a pin 102, latching pawl 118 is rocked counter-clockwise, as viewed in Fig. 4, or clockwise as seen in Fig. 5, and is maintained in its rocked position by the cooperation of detent 123 with pin 122 on pawl 118. Thus, it can be seen, that upon restoration of each active segment 110 to its normally inactive or "0" registering position, the corresponding pawl 118 is ineffective to restrain movement of the segment 110 to its initially differentially set position under the urgency of the tensioned spring 114 associated therewith. Consequently, upon return of the pin carriage to the right to its normally inactive position, as seen in Fig. 6, subsequent to the restoration of each of the active segments 110 to their "0" position, the multiplied factor originally set in the pin carriage, as determined by the respective actively set pins 102, will be reset in the pin carriage. Following the return of the last or highest order rack 110 to its "0" position, the shift control is again operated to produce an idle shifting movement of the pin carriage, in which position all readjusted rack segments 110 are simultaneously returned to their normally inactive positions, latch pawls 118 are restored to their normally operative position for engagement by the stop ends 117 of segments 110, and the depressed multiplication control key is released to terminate the multiplication operation.

As the multiplication operation is terminated, bail or roller 104 becomes effective to reset the actively moved pins to their normally inactive position and to return the adjusted rack segments 110 to their "0" position. Roller 104 is supported at its ends by similar arms 214 and 215 (Figs. 4 and 10) secured in spaced-apart relation on shaft 112. Upon clockwise rotation of shaft 112 (Fig. 4) transverse roller 104 is removed in an arc for engagement with a spoke 216 of each adjusted rack segment 110 to restore all such segments to the normally inactive position shown and by a camming engagement with the top surface of the respectively actively set pins 102, serves to simultaneously restore the pins to their normally inactive position.

The extent of the arcual movement of roller 104 (Fig. 4) is such that the rack segments 110 are returned to a position beyond the "0" position thereof to enable the restoration of latching pawls 118 to their active position for engagement by the stop end 117 of the respective segments 110 under the urgency of the associated springs 114 as roller 104 is returned to the normal position shown in Fig. 4. Pawls 118 are rocked clockwise (Fig. 4) simultaneously, to the active position shown, in timed relation to the return of the rack segments 110 to the overstroke position thereof. For this purpose, a rod 217 extends transversely of the pin carriage between side plates 87 and 88 and is secured at its one end in the lower end of an arm of a bellcrank 218 pivoted at 220 on side plate 87 and at its other end in the lower end of an arm of a bellcrank 219 pivoted at 221 on side plate 88. The lower edge of the horizontally disposed arm of each bellcrank 218, 219 (Figs. 4 and 10) is inclined to provide a camming surface for engagement by respective pins 222 and 223 on arms 214 and 215. Thus, it can be seen that as the rack segments 110 are rotated to their overstroke position, pins 222 and 223 on respective arms 214, 215 engage the cam arms of respective bellcranks 218, 219 to rock rod 217 in a counter-clockwise direction as viewed in Fig. 4, or clockwise as viewed in Fig. 5, to restore all pawls 118 to the active position shown in Fig. 4. As the pin 122 on each pawl 118 passes beyond the vertex of the V-shaped portion 123 of each spring detent 124, the inclination provided thereby serves to complete the counter-clockwise rotation of the pawls 118 (Fig. 5) to a position determined by the engagement of the upper extension thereof with the left end of the slots in the upper pin holding plate 89 through which the pawls extend.

The arcual counter-clockwise rotation of roller 104 (Fig. 10) is effected through a train of gears in cooperation with a cam 228 secured on main drive shaft 58 during the idle shifting movement of the pin carriage when it is returned to the right, as seen in Fig. 6, to its inactive or "home" position. A ten-tooth segmental gear 229 (Fig. 10) is secured to the extended right end of shaft 112 and has a notch 230 in the periphery of the mutilated portion thereof for a purpose to be hereinafter described. A relatively light spring 231 is looped in a semicircle about the hub of the gear segment 229 and is secured at its one end to a pin on side plate 88 and at its other end to a pin on the face of the gear 229. In the normally inactive position of the gear segment 229, the tension of spring 231 is sufficient to urge the leading tooth of the segment into enmeshment with an idler gear 232 pivoted at 233 on side plate 88 of the pin carriage. Idler gear 232 is enmeshed with the teeth of a sector 234 pivotally mounted at 235 on side plate 88 and having an ear 236 formed at a right angle to the face thereof for cooperation with cam 228, upon the clockwise rotation thereof (Fig. 10), when the pin carriage has been moved to its extreme right-hand position, as viewed from the front of the machine, and in the last 180° of the cyclic rotation of cam 228. It can be seen therefore, that during its last 180° of rotation, cam 228 rocks sector 234 counter-clockwise and gear 232 clockwise to impart rotation to gear segment 229 and therefore arms 214, 215 and roller 104 in a counter-clockwise direction, at the same time relieving the tension of spring 231. Immediately following the operation of cam 228 and sector 234 a relatively strong spring 237, secured at its one end on a pin 238 on side plate 88 and at its other end to an ear 239 formed at right angles to the face of sector 234, serves to restore sector 234 in a clockwise direction to a position determined by the engagement of the ear 239 with a stop formed by the inner edge of side plate 88 thereby returning the various parts to the normal position shown in Fig. 10.

The release of a depressed multiplication control key and the termination of a multiplying operation is controlled in the manner disclosed in said Patent No. 2,399,917. Briefly, as the pin carriage is shifted to its extreme right-hand position, lever 146 (Fig. 7) is rocked clockwise tensioning spring 149. Bellcrank 242 also pivoted at 147 to the base of the machine has one arm thereof secured to lever 146 for movement therewith. The end 244 of the other arm 245 of bellcrank 242 is operatively related to the lower end of one of two similar latch levers 246 (Fig. 12) secured on shaft 247 journalled in frame members 45 and 94, one such lever being provided for each pair of aligned control keys 38, 42 and 39, 40. Rocking movement of lever 146 and therefore bellcrank 242 is effective to move the latch tooth 248 of each of latching levers 246 out of engagement with the depressed key which is therefore free to rise. It will be understood, that upon depression of any multiplier key 36 the pin carriage is shifted under the control of its escapement mechanism so that lever 146 and bellcrank 242 are disabled with respect to the multiplication key latch mechanism. The clockwise rocking of lever 146 (Fig. 7) and the counter-clockwise rocking of latching levers 246 (Fig. 12) and therefore shaft 247 serves to terminate the multiplication operation. The rearward end of arm 249 (Fig. 9) secured on the end of shaft 247 underlies pin 202 on setting lever 197 and is effective upon counter-clockwise rocking of shaft 247 (Fig. 12) or clockwise rocking of the shaft as seen in Fig. 9 to restore the setting lever 197 to its inactive position when springs 195 and 291 move the respective latching levers 193 and 200 into engagement with the ear 196 and pin 202 respectively. With the restoration of setting lever 197 to the position shown in Fig. 9, the multiplying mechanism is rendered inoperative and shaft 177 is rocked counter-clockwise to disable feed pawl 170.

When it is desirable to use the same multiplier factor for a plurality of multiplication operations repeat multiplier key 41 is moved to its operative or forward position following the entry of the multiplier factor into the pin carriage, in which position of the key various mechanisms are conditioned to render gear segment 229 ineffective to restore pins 102 and multiplier segments 110 to their inactive position upon operation of cam 228 and to remove the nose of stop pawl 152 from its engagement with the teeth 97 of pin carriage rack 95 to release the carriage for movement to an active position determined by mechanism also under the control of the operatively moved key.

As described supra, following the step-by-step return of each active rack segment 110 to "0" to control the ordinal multiplying operation, the pin carriage is returned or shifted one step to the right to move the next higher order rack segment 110 into active position when, due to the fact that the corresponding latch pawl 118 was disabled upon the entry of each digit into the pin carriage, the previously active rack is immediately returned to its initial setting under the urgency of the associated spring 114. Therefore, it can be seen that when the pin carriage is moved into its extreme right-hand position to terminate the multiplying operation, the multiplier factor originally set into the pin carriage is again registered therein.

Cam 228 is normally effective in the rightmost position of the pin carriage to simultaneously restore all rack segments 110 to their "0" position and to render latch pawls 118 effective to restrain the segments 110 against movement from their restored position. However, upon movement of multiplier repeat key 41 to its operative position, segmental gear 229 (Fig. 10) is rendered ineffective to mesh with idler gear 232 upon rotation of cam 228 in the normally inactive position of the pin carriage.

Key 41 is guided in its movement by the engagement of an elongated lateral extension 254 (Figs. 6 and 12) in a slot in transverse bracket 255 secured at its ends on frame members 45 and 94 and by a slot in a bracket 256 secured in a vertical position by any suitable means to upper keyboard plate 75. Key 41 carries a pin 257 normally disposed in the right end of a slot 258 in an arm 259 secured on a shaft 260 journalled at its one end in frame member 45 and at its other end in a bracket 261 secured on frame member 94. An arm 262 is secured to shaft 260 adjacent side frame member 45 (Figs. 6, 10, and 11) and at its rearward angularly disposed end carries a pin 263 having a conically shaped end for camming engagement with a shoulder 264 of notch 230 in segmental gear 229. As key 41 is moved forwardly, or to the left as viewed in Fig. 12, pin 257 serves through the angularly disposed slot 258 in arm 259 to rock shaft 260 clockwise thereby moving camming pin 263 (Fig. 10) downwardly into position to engage the shoulder 264 of gear segment 229 as the pin carriage is moved into its rightmost position. Gear segment 229 is thereby rocked in a clockwise direction (Fig. 10) sufficiently to move the leading effective tooth thereof out of contiguity with a tooth of idler gear 232 against the urgency of spring 231. Therefore, clockwise rotation of idler gear 232 is ineffective to impart rotation to gear segment 229.

Following the initial entry of a repeat multiplier factor into the pin carriage and the ordinal escapement of the carriage to the left (Fig. 6) in accordance with the number of digits in the factor, the forward movement of key 41 serves to condition mechanism to predetermine the escaped position of the pin carriage thereafter in subsequent multiplying operations using the repeat factor. This mechanism is conventional and therefore will be only briefly described herein. Arm 268 (Figs. 7 and 12) is pivotally mounted at 147 on the base of the machine and lies in a plane parallel with and adjacent arm 245 of bellcrank 242. Arm 268 is provided at its free end with an arcuate rack 269 formed at right angles thereto and also carries an offset extension 270 having depending ear 271 normally urged by spring 267 into engagement with the forward edge of arm 245. Rack 269 is adapted for engagement by tooth 272 at the end of one arm 273 of a 3-armed lever 274 pivoted at 275 on frame member 94. Center arm 276 of 3-armed lever 274 carries pin 277 engaged in the bifurcated end of depending arm 278 of bellcrank 279 pivoted at 280 on bracket 281 secured on lower keyboard plate 76. The laterally extended ear 282 on the horizontal arm of bellcrank 279 underlies the projection at the free end of arm 283 pivoted at 284 on a bracket secured to the upper keyboard plate 75. Pin 285 on the depending ear of key extension 254 is engaged in the elongated slot 286 angularly disposed in the free end of arm 283, which pin and slot engagement serves upon movement of key 41 to the left (Fig. 12) to rock arm 283 clockwise thereby imparting a clockwise rotation to bellcrank 279 and a counter-clockwise rotation to 3-arm lever 274.

With the pin carriage in its "home" or inactive position, arcuate rack 269 is so positioned relative to the tooth 272 that key 41 would be blocked against movement. However, it can be seen that as the pin carriage is escaped to the left upon entry of the multiplier digits therein, arcuate rack 269 would follow lever 146 and bellcrank 242 in a counter-clockwise direction (Fig. 7) so that for each ordinal escapement of the pin carriage a tooth space in the rack 269 will be moved into operative relation with tooth 272. Consequently, if there are three digits in the multiplier factor, the third tooth space from the left, as seen in Fig. 12, would be moved into position for engagement by tooth 272 upon movement of key 41 to the left. The engagement of the tooth 272 with the teeth of the rack 269 locks the rack in the ordinally escaped position of the pin carriage, therefore, as the pin carriage is returned ordinally to the right during the multiplying operation, lever 146 and bellcrank 242 are rocked clockwise (Fig. 7) tensioning spring 267 and ultimately terminating the multiplication operation.

If the nose of the escapement stop pawl 152 (Fig. 8) is moved from its engagement with the teeth 97 of the pin carriage rack, the spring 149 will immediately return the pin carriage to the active position determined by the engagement of arm 245 with ear 271 on arm 268. The disengagement of the nose of escapement stop pawl 152 from teeth 97 is controlled in a well known manner upon termination of a multiplication operation. Briefly, as multiplier repeat key 41 (Fig. 12) is moved to the left to its active position, it will be recalled that 3-armed lever 274 is rocked in a counter-clockwise direction to engage tooth 272 with an associated tooth space of arcuate rack 269 thereby determining the extent of movement of the pin carriage under the urgency of spring 149 immediately upon release of stop pawl 152. To disable stop pawl 152, link 290 is pivoted at its forward end at 291 on arm 276 intermediate the length thereof, and at its rearward end has a pin and slot engagement 292 (Fig. 9) with arm 293 mounted at 294 for oscillatory and reciprocatory movement on bracket 261 on side frame member 94. At its lower end, arm 293 is provided with notch 295 for engagement with square stud 296 on setting lever 197. In the inoperative position of multiplier repeat key 41 (Fig. 9), pin 292 is maintained in engagement with the rearward end of the slot in arm 293 to retain notch 295 out of engagement with square stud 296. However, with the forward movement of key 41 and the counter-clockwise rocking of lever 274 (Fig. 12) link 290 is moved forwardly of the machine to position pin 292 (Fig. 9) in the forward end of the slot in arm 293 tensioning spring 297 secured at its one end to a hook on link 290 and at its other end in an opening in arm 293. As link 290 is moved to the right (Fig. 9) the forward edge of arm 293 adjacent notch 295 is moved into contact with stud 296 so that as setting lever 197 is rocked clockwise to initiate operation of the multiplying mechanism, stud 296 is moved downwardly and tensioned spring 297 rocks the notch 295 of arm 293 into engagement with square stud 296. The arcuate upper end of arm 293 underlies lateral extension 298 of stop pawl 152 (Figs. 8 and 9) in a manner such that, subsequent to the engagement of notch 295 with square stud 296 and upon termination of the multiplying operation when setting lever 197 is rocked counter-clockwise by arm 249 to the normally inactive position shown in Fig. 9, arm 293 is moved upwardly to impart a counter-clockwise rotation to escapement stop pawl 152 (Fig. 8) thereby releasing the pin carriage for return movement to its active position.

As previously explained, the depression of the multiplier correction key 42 operates in a conventional manner to initiate the operation of feed pawl 170 to return each active segment step-by-step to its "0" position and to enable the ordinal return of the pin carriage to its rightmost position, as viewed in Fig. 6. However, it will be recalled that in the use of my invention, each active rack, upon reaching the "0" position thereof, is returned under the influence of its spring 114 to the digit representing position to which it was initially adjusted. Not until the pin carriage has reached its rightmost position are all of the segments 110 simultaneously restored to their zero latched position and the associated pins 102 returned to their normally inactive position by the rocking movement of the transverse roller 104. Since the movement of multiplier repeat key 41 forwardly of the machine serves to disable the operation of the restore roller 104, means are provided for preventing a depression of multiplier correction key 42 when key 41 is operatively positioned since a depression of the key would serve no purpose whatever.

Referring to Figs. 6, 7, and 12, one arm 302 of a bail 303 pivotally mounted on shaft 199 supports one end of a spring 304, which at its other end is secured to a stud on the frame member 94 and serves to maintain the upper end of arm 302 in engagement with a pin 305 adjacent the end of an arm 306 of 3-armed lever 274. At its right end (Fig. 7) bail 303 carries an upwardly extending arm 307 rockable to a position underlying a pin 308 on key 42 when 3-armed lever 274 is rocked counter-clockwise to its active position.

To discontinue the use of a repeat multiplier factor, key 41 is moved to its inactive position raising conical pin 263 to the position shown in Fig. 10, rocking 3-armed lever 274 clockwise (Fig. 12) to remove tooth 272 out of engagement with the active tooth space in arcuate rack 269 and through link 290 to move notch 295 out of engagement with square stud 296 (Fig. 9) to the position shown where it will not be engaged by stud 296 upon return of setting lever 197 to its latched position.

When it is desired to clear the repeat multiplier factor from the multiplier pin carriage, key 41 is moved to its rearward or inactive position following the penultimate multiplying operation. Consequently, as the carriage is shifted to its rightmost position (Fig. 6), during the last operation in which the repeat factor is to be used, gear segment 229 (Fig. 10) remains in position to mesh with idler gear 232 thereby enabling the counter-clockwise rocking movement of restore roller 104. Similarly, key 41 may be moved to its inactive position following the last multiplying operation in which the repeat factor is to be used when a depression of the multiplier correction key 42 initiates a return of the pin carriage to its rightmost position (Fig. 6) to effect a restoration of the active segments 110 and the pins 102 associated therewith to their inactive position without a product registration in the accumulator dials. At any time during the last multiplication operation, key 41 may be inoperatively positioned to terminate the control by the repeat multiplier factor set in the pin carriage, upon conclusion of the immediate multiplying operation. If key 41 is moved rearwardly during a multiplying operation and tooth 272 is removed from engagement with the active tooth space in arcuate rack 269, tensioned spring 267 (Fig. 7) serves to move ear 271 of arm 268 into engagement with arm 245 secured on lever 146.

*Operation*

As each digit of a multiplier factor is entered into the multiplier keyboard, a corresponding segment 110 is differentially adjusted in the multiplier pin carriage when the associated zero latch pawl 118 (Figs. 3, 4, and 5) is rocked to and detented in its segment releasing position. Substantially simultaneously with the adjustment of each segment the pin carriage escapes ordinally to the left to its active position. Upon depression of a control key 38, 39, or 40 the lowest order segment 110 in the active position thereof is restored step-by-step to its "0" position when it becomes effective to initiate a right shift of the accumulator and the pin carriage to move the next higher order segment 110 into active position. However, since the holding pawls 118 have been disabled, each lower order rack 110, upon reaching its "0" position, is restored to its digit representing position under the urgency of the associated spring 114 and the pin carriage is ordinally shifted to the right as viewed in Fig. 6. Consequently, when the carriage reaches its rightmost position, the segments 110 are readjusted to again represent the multiplier factor previously entered in the pin carriage. In the last step movement of the pin carriage to the right, i. e., the idle shifting movement thereof, cam 228 (Fig. 10) rocks the sector 234 counter-clockwise and through gear 232 and segment 229 rocks shaft 112 and therefore restore bail 104 counter-clockwise to restore all of the readjusted segments 110 to their zero latched position and the associated pins 102 to their normally inactive position. However, if a multiplier factor represented by the initially adjusted segments 110 is to be used to control a plurality of multiplication operations, multiplier repeat key 41 is moved forwardly or to the left, as viewed in Fig. 12, immediately following the entry of the factor into the pin carriage. In the active position of the key 41, lever 274 is rocked to engage tooth 272 (Fig. 12) with the tooth space of the arcuate rack 269 aligned therewith as determined by the ordinally escaped position of the pin carriage and the counter-clockwise rocked position of the rack (Fig. 7). With the rocking of lever 274, link 290 is moved to the left (Fig. 12), or to the right as viewed in Fig. 9, to tension spring 297. The leftward movement of key 41 (Figs. 10 and 12) also serves through pin 257 and slot 258 to rock shaft 260, arm 262 and therefore conical pin 263 in a clockwise direction to position pin 263 for engagement by shoulder 264 on gear segment 229 upon movement of the pin carriage into its rightmost position. The engagement of the shoulder 264 with the conical pin 263 serves to impart a clockwise rotation to gear segment 229 sufficient to prevent the gear from meshing with idler gear 232 thereby preventing a rocking movement of the restore roller 104 so that the previously set multiplier factor remains in the pin carriage for use in subsequent multiplication operations upon escapement of the pin carriage to the left to its active position.

It will be recalled that upon depression of a control key the accumulator is shifted to the left when the left shift mechanism becomes effective to release latch lever 200 (Fig. 9) and spring 210 becomes effective to impart a clockwise rotation to setting lever 197 thereby initiating the operation of the multiplying mechanism. Upon release of setting lever 197, tensioned spring 297 moves notch 295 into position for engagement by square stud 296 upon restoration of setting lever 197 to the normally inactive position shown in Fig. 9 at the conclusion of the multiplying operation. As stud 296 engages notch 295, arm 293 is moved upwardly thereby rocking escapement stop pawl 152 in a counter-clockwise direction (Fig. 8) releasing the nose thereof from engagement with the teeth 97 on pin carriage escapement rack 95. The pin carriage is then released for movement to the active position determined by the engagement of arm 245 with the ear 271 in the locked position thereof.

Key 41 may be returned to its inactive position at any time during the last multiplying operation in which the repeat factor is to be used or immediately prior to the last multiplying operation or following the last multiplying operation and upon depression of multiplier correction key 42.

I claim:

1. In a calculating machine having a product register, actuating means therefor, a drive means for said actuating means, and means for controlling operation of said actuating means to perform a plural order multiplying operation, said last-named means including a multiplier selection carriage having a plurality of ordinal differentially settable elements urged in a setting direction from an inactive position, means for holding said elements in an inactive position, a series of ordinally arranged stops adjustable from an inoperative position for cooperation with said elements to determine the differential setting thereof upon release of said holding means, means for moving said carriage in one direction from a normal position, a multiplier keyboard mechanism effective to adjust said stops, release said holding means, and to initiate operation of said moving means, means for returning said elements sequentially to the inactive positions thereof during a multiplying operation, means rendered effective by each of said elements upon operation of said returning means to return said carriage step-by-step to its normal position during a multiplying operation, resilient means for retaining said holding means released during a multiplying operation whereby upon return of said elements to the inactive positions thereof said elements are urged to resume the factor representing positions determined by the adjustment of said stops, means for restoring said holding means to operative position relative to said elements, means rockable to restore said stops to the inoperative positions thereof, to return said elements to their inactive position, and to effect operation of said restoring means, means for rocking said rockable means, means driven by said drive means for actuating said rocking means upon return of said carriage to its normal position, a key, means settable by said key to render said rocking means ineffective for control by said driven means in the normal position of said carriage, means positionable by said key to determine the return of said carriage by said moving means to the position of said carriage subsequent to the setting of a multiplier factor therein by said keyboard mechanism, and means conditioned by said positionable means for control by the movement of said carriage at the conclusion of a multiplying operation to enable the operation of said moving means.

2. In a calculating machine having a product register, differential actuating means therefor, registration control means including means settable to represent a multiplicand and means settable to represent a multiplier, said multiplier representing means including a plurality of ordinal differentially adjustable elements in a transversely shiftable carriage, means normally latching said elements in the "0" position thereof, selectively settable means to control the differential adjustment of said adjustable elements upon release of said latching means, means for setting said selectively settable means and for releasing said latching means to effect adjustment of said elements and to actively position said carriage in ordinal sequence from an initial position in accordance with a multiplier factor, means for initiating a multiplying operation, said registration control means including means cyclically operable during a multiplying operation to restore said elements one by one to "0" position and means for returning said carriage step-by-step to initial position, said elements being readjusted differentially upon return thereof to "0" to represent the same multiplier factor, means for simultaneously restoring said latching means to latching position, power driven means operable upon return of said carriage to its initial position to simultaneously restore all readjusted elements to "0" position and to operate said latch restoring means, and mechanism for conditioning the machine for repeated use of a constant multiplier factor, the combination comprising means settable subsequent to the adjustment of said elements in accordance with a multiplier factor and prior to the operation of said multiplying initiating means, and means positionable by said settable means for control by the movement of said carriage to the initial position to render said power driven means ineffective.

3. In a calculating machine having a product register, registration control means including means settable to represent a multiplicand and means settable to represent a multiplier, said multiplier representing means comprising a plurality of orders of spring-urged elements in a shiftable carriage, a latch for each of said elements to retain said elements in the "0" position, a plurality of ordinally arranged stops for each of said elements selectively settable in each order to determine the differential adjustment of said elements one by one in accordance with the digits of a multiplier factor upon release of each of said latches, means for shifting said carriage one ordinal step from its normal position for each digit of the multiplier, resilient means for each of said latches effective to retain said latches in either the active or inactive position thereof, a keyboard mechanism for setting said stops, releasing said latches to the inactive position, and enabling said shifting means, means for initiating a multiplying operation, said registration control means including a cyclic drive means and means operated by said cyclic drive means during the multiplying operation to restore said elements one by one to "0" position and means for returning said carriage step-by-step to one step beyond said normal position to terminate the multiplying operation, each of said elements being spring-urged to resume the same differentially adjusted position upon restoration therefrom to "0," means for moving said latches simultaneously to their active position, a rockable bail for simultaneously returning said stops to their initial position, restoring said elements to their "0" position, and actuating said moving means to relatch said elements in the "0" position thereof, a cam operated means driven by said cyclic drive means effective to rock said bail upon movement of said carriage one step beyond said normal position, manually operable means selectively settable subsequent to the operation of said keyboard mechanism to effect return of said carriage at the conclusion of the multiplying operation to the position occupied by said carriage following the entry of a multiplier factor therein, and means positionable by said manually operable means to prevent the operation of said rockable bail by said cam operated means upon termination of the multiplying operation.

4. In a calculating machine having a register, an actuating means therefor, a power means for said actuating means, a registration controlling means for said actuating means including a selection mechanism, said mechanism comprising a plurality of ordinal elements spring-urged for differential adjustment representative of a factor, means normally actively positioned to restrain said elements in the "0" position thereof, means settable from an inactive position to determine the differential adjustment of said elements, a keyboard mechanism for setting said settable means in accordance with the digits of a factor and for moving said restraining means to an inactive position, said registration controlling means including means for returning said elements to "0" position: a mechanism for conditioning the machine for repeated use of the same factor comprising means for detenting said restraining means in the inactive position thereof thereby enabling the spring-urged readjustment of said elements to the same factor representing position from which they were returned to "0," a bail for simultaneously restoring said settable means to inactive position, returning said elements to "0" position, and effecting an active positioning of said restraining means, means driven by said power means to actuate said bail subsequent to the readjustment of said elements to the factor representing position, and a manipulable means for rendering said bail ineffective for control by said power driven means.

5. In a calculating machine having a register, an actuating means therefor, a power means, a registration controlling means for said actuating means including a selection mechanism, said mechanism comprising a plurality of ordinal elements spring-urged for differential adjustment representative of a factor, means normally actively positioned to restrain said elements in the "0" position thereof, means settable from an inactive position to determine the differential adjustment of said elements, a keyboard mechanism for setting said settable means in accordance with the digits of a factor and for moving said restraining means to an inactive position, said registration controlling means including means for returning said elements one by one to "0" position and means rendered effective by each of said elements in the "0" position thereof for disabling said returning means to enable a spring-urged readjustment of each of said elements to its initial differentially adjusted position: mechanism for conditioning the machine for repeated use of the same factor comprising a first bail for returning said restraining means to the normally active position thereof, a second bail for restoring said settable means to the inactive position thereof, for returning said elements to "0" position and operating said first mentioned bail, a gear train driven by said power means at the conclusion of the operation of said registration controlling means, a gear segment for controlling operation of said bail, spring means normally effecting engagement of said segmental gear with said gear train for control thereby, a manually settable key, and means operated by said key for disabling the operation of said spring means to prevent engagement of said gear segment with said gear train upon operation thereof.

6. In a calculating machine having a register, a cyclically operable actuating means therefor, a selection mechanism, said mechanism comprising a plurality of ordinal elements spring-urged for differential adjustment representative of a factor, means normally actively positioned to restrain said elements in the "0" position thereof, means differentially settable to determine the adjustment of said elements to represent the digits of a factor, a keyboard mechanism for setting said settable means and for inactively positioning said restraining means to enable the adjustment of said elements, registration control means for controlling the operation of said actuating means in accordance with the adjustment of said elements: mechanism for conditioning the machine for repeated use of a constant factor comprising a manually operable key, means normally operable to simultaneously restore said settable means to inactive position, to return the adjusted elements to "0" position, and to actively position said restraining means, power-driven means effective to control the operation of said restore means upon termination of the operation of said registration control means, and means rendered operable by said manually operable key to disable the operation of said power-driven means.

References Cited in the file of this patent
UNITED STATES PATENTS

| | | |
|---|---|---|
| 2,371,752 | Friden | Mar. 20, 1945 |
| 2,376,997 | Friden et al. | May 29, 1945 |
| 2,427,271 | Friden et al. | Sept. 9, 1947 |